United States Patent
Peleg et al.

(10) Patent No.: US 9,817,971 B2
(45) Date of Patent: Nov. 14, 2017

(54) USING CALL STACK SNAPSHOTS TO DETECT ANOMALOUS COMPUTER BEHAVIOR

(71) Applicant: INTERNATIONAL BUSINESS MACHINES CORPORATION, Armonk, NY (US)

(72) Inventors: Ron Peleg, Tel-Aviv (IL); Amir Ronen, Haifa (IL); Tamer Salman, Haifa (IL); Shmuel Regev, Tel-Aviv (IL); Ehud Aharoni, Kfar Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 14/926,216

(22) Filed: Oct. 29, 2015

(65) Prior Publication Data
US 2017/0124324 A1    May 4, 2017

(51) Int. Cl.
*G06F 21/55* (2013.01)
*G06N 7/00* (2006.01)

(52) U.S. Cl.
CPC ........... *G06F 21/554* (2013.01); *G06N 7/005* (2013.01); *G06F 2221/033* (2013.01)

(58) Field of Classification Search
None
See application file for complete search history.

(56) References Cited

U.S. PATENT DOCUMENTS

| 7,620,987 B2 | 11/2009 | Shelest et al. |
| 8,713,631 B1 * | 4/2014 | Pavlyushchik ....... G06F 21/566 726/1 |
| 8,984,331 B2 | 3/2015 | Quinn |
| 2008/0250499 A1 | 10/2008 | Moat et al. |

(Continued)

OTHER PUBLICATIONS

Henry Feng, Oleg Kolesnikov, Prahlad Fogla, Wenke Lee, Weibo Gong, "Anomaly Detection Using Call Stack Information," SP '03 Proceedings of the 2003 IEEE Symposium on Security and Privacy, May 11-14, 2003.*

(Continued)

*Primary Examiner* — Kaveh Abrishamkar
(74) *Attorney, Agent, or Firm* — Daniel J. Swirsky; AlphaPatent Associates Ltd.

(57) ABSTRACT

Detecting computer anomalies by determining probabilities of encountering call stack configurations at various depths, the call stacks being associated with software application instances on computers having the same operating system, where snapshots of the call stacks are recorded on the computers responsive to detecting predefined software application events, determining entropies of call stack configurations at various call stack depths using their associated probabilities, determining stack frame rarity scores of call stack configurations at various depths based on their associated stack frame entropies in accordance with a predefined rarity function, determining a call stack rarity score of any given call stack configuration as the maximum stack frame rarity score of the given configuration, and detecting an anomaly associated with any given one of the computers (Continued)

where any of the snapshots recorded on the given computer is of a call stack whose call stack rarity score meets a predefined anomaly condition.

12 Claims, 4 Drawing Sheets

(56) References Cited

U.S. PATENT DOCUMENTS

| | | | |
|---|---|---|---|
| 2009/0187396 A1* | 7/2009 | Kinno | G06F 8/20 |
| | | | 703/22 |
| 2011/0265182 A1 | 10/2011 | Peinado et al. | |
| 2011/0277035 A1* | 11/2011 | Singh | G06F 21/52 |
| | | | 726/25 |
| 2012/0255010 A1* | 10/2012 | Sallam | G06F 21/572 |
| | | | 726/24 |
| 2014/0108803 A1 | 4/2014 | Probert | |
| 2016/0180089 A1* | 6/2016 | Dalcher | G06F 21/566 |
| | | | 726/23 |
| 2016/0196428 A1* | 7/2016 | Momot | G06F 21/54 |
| | | | 726/23 |
| 2016/0300060 A1* | 10/2016 | Pike | G06F 17/30371 |
| 2017/0124324 A1* | 5/2017 | Peleg | G06F 21/554 |

OTHER PUBLICATIONS

"Address space layout randomization", Wikipedia, https://en.wikipedia.org/wiki/Address_space_layout_randomization, downloaded on Aug. 24, 2015.

"List of IBM Patents or Patent Applications Treated as Related," Nov. 25, 2015.

* cited by examiner

USING CALL STACK SNAPSHOTS TO DETECT ANOMALOUS COMPUTER BEHAVIOR

BACKGROUND

Malware exploits take advantage of bugs and flaws in existing software, and cause them to divert execution along a route dictated by the malware author. For example, a malware author can exploit a bug in the rendering engine of a web page browser by creating a web page that is configured to trigger the bug and thereby cause the browser to execute malicious code that is embedded in the delivered web page, such as in JavaScript™ or even in its image resources.

SUMMARY

A common effect of malware exploits that take advantage of bugs and flaws in existing software is that the call stack of the software that is the target of the exploit will reflect the path of the executed malicious code. The invention, in embodiments thereof, detects anomalous computer behavior, such as may be caused by malware, by analyzing anomalies in call stack snapshots taken at various control points of software applications during their execution on multiple computers.

In one aspect of the invention a computer anomaly detection method is provided, the method including determining stack frame probabilities of encountering various configurations of multiple call stacks at various call stack depths, where the call stacks are associated with multiple instances of a software application on multiple computers having the same operating system, and where multiple snapshots of the call stacks are recorded on the computers responsive to detecting a predefined event in connection with the software application, determining stack frame entropies of various configurations of the call stacks at various call stack depths based on their associated stack frame probabilities, determining stack frame rarity scores of various configurations of the call stacks at various call stack depths based on their associated stack frame entropies in accordance with a predefined rarity function, determining a call stack rarity score of any given configuration of the call stacks as the maximum stack frame rarity score of the given configuration, and detecting an anomaly associated with any given one of the computers where any of the snapshots recorded on the given computer is of a call stack whose call stack rarity score meets a predefined anomaly condition.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
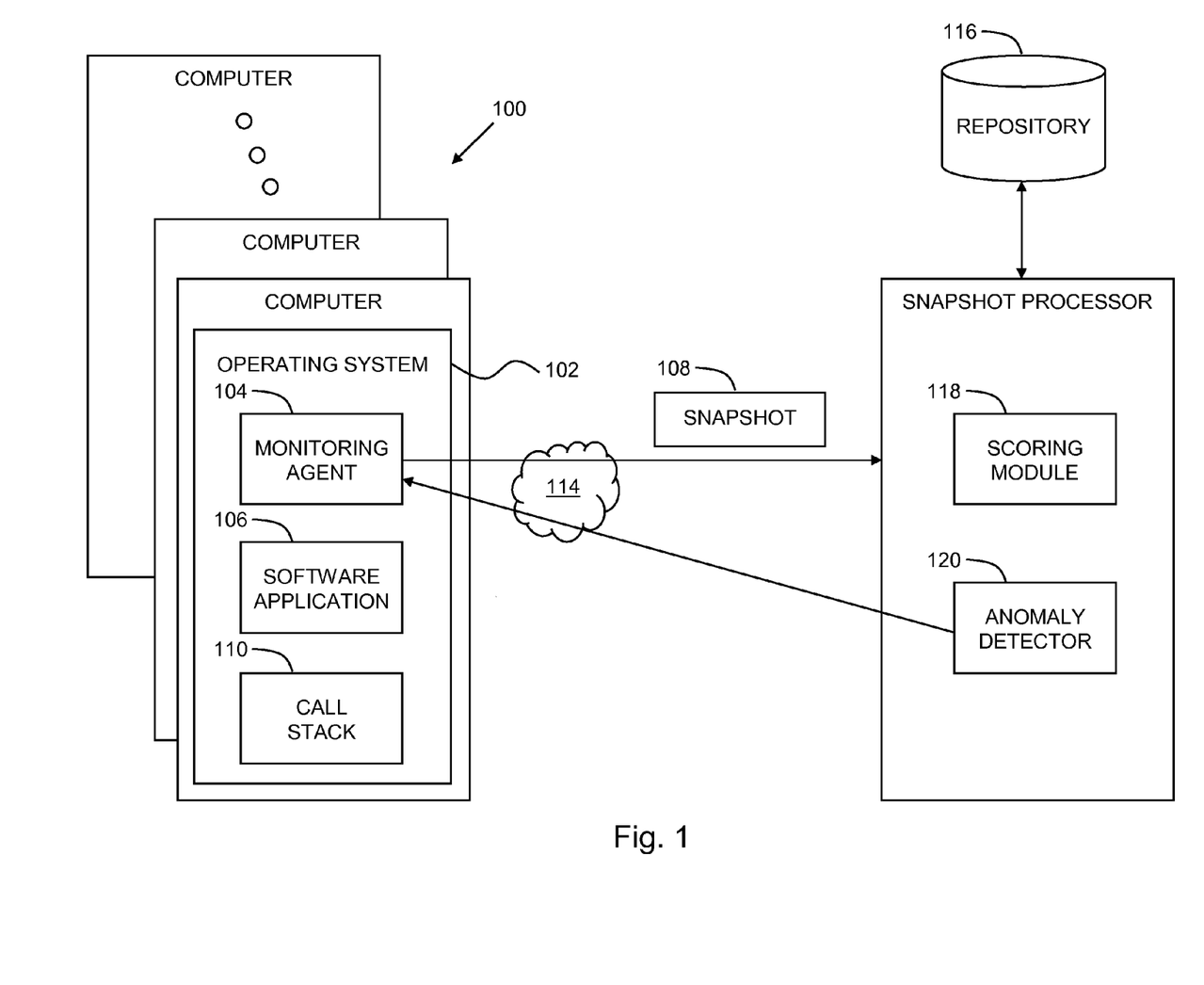
FIG. 1 is a simplified conceptual illustration of a computer anomaly detection system, constructed and operative in accordance with an embodiment of the invention.

Reference is now made to FIG. 1, which is a simplified conceptual illustration of a computer anomaly detection system, constructed and operative in accordance with an embodiment of the invention. In the system of FIG. 1, each computer in a group of computers 100 is configured with the same operating system 102 and a monitoring agent 104 that monitors an instance of the same software application 106, such as of a browser, on the computer. On each computer in group 100, monitoring agent 104 preferably detects occurrences of one or more predefined events in connection with software application 106, such as create process events, which detection may be triggered using event-specific kernel hooks implemented in accordance with conventional techniques at one or more control points. When monitoring agent 104 detects any of the predefined events, monitoring agent 104 records a snapshot 108 of a call stack 110 associated with software application 106, where snapshot 108 includes a descriptor identifying the event, as well as information regarding one or more stack frames $S_0 \ldots S_n$, preferably up to a maximum depth of consecutive stack frames, such as 10, where $S_0$ is the last call before switching to kernel mode for the system call. Snapshot 108 preferably includes, for each stack frame, the event type, the module name, the module size, and address information, such as including the module base address and the call return address, and/or including the offset of the call return address relative to the module base address. An example of an instance of a snapshot 108 is as follows:

---

{
    "event": {
        "time": "Oct 18, 2015 08:31:00",
        "name": "process_create_event",
        "pid": "1512",
        "0_frame": "15919964",
        "0_ip": "2089865658",
        "0_mod_base": "2089811968",
        "0_mod_name": "ntdll.dll",
        "0_mod_size": "729088",
        "1_frame": "15919968",
        "1_ip": "2088865493",
        "1_mod_base": "2088763392",
        "1_mod_name": "kernel32.dll",
        "1_mod_size": "1007616",
        "2_frame": "15922744",
        "2_ip": "2011081068",
        "2_mod_base": "2010972160",
        "2_mod_name": "advapi32.dll",
        "2_mod_size": "634880",
        ...}
    ...}

--- where #n_ indicates properties of stack frame n relative to a zero-based index. This may be normalized by determining the offset of each call return address relative to its module base address as follows, such as when address space layout randomization (ASLR) is used:

First frame (0) is in ntdll.dll. 0_ip is the instruction pointer return address, 0_mod_base is the module base. Offset=0_ip-0_mod_base=53690

Second frame (1) is in kernel32.dll. Offset=102101

Third frame (2) is in advapi32.dll. Offset=108908

Each monitoring agent 104 preferably provides its snapshots 108 to a snapshot processor 112, such as via a computer network 114.

Snapshot processor 112 receives snapshots 108 from the various monitoring agents 104 for multiple events detected on the computers in group 100, normalizes their address information as described above, if necessary, and stores the snapshots 108 in a snapshot repository 116. Let S be a population of snapshots from group 100 for the same type of event detected for the same software application 106, and let Stk be an instance of a call stack in S. [Stk|k] is defined as the first k frames of Stk. A scoring module 118 calculates, for all possible values of [Stk|k] in S, the number N([Stk|k]) as the number of computers in group 100 that reported a snapshot that includes the same [Stk|k] configuration for the same type of event. Scoring module 118 calculates the probability of encountering a particular [Stk|k] configuration among all the call stacks in S as:

$$P([Stk|k]) = N([Stk|k]) / \Sigma_{[stk'|k]} N([Stk|k])$$

where the summation is over all possible unique values of [stk'|k] in S (i.e., all possible unique configurations of the first k stack frames seen in group 100). Given the Shannon entropy of a discrete random variable P:

$$Ent(P) = -\Sigma p * \log(p)$$

scoring module 118 calculates the entropy for a given k as:

$$Ent(k) = -\Sigma_{[stk|k]} P([stk|k]) * \log(P([stk|k]))$$

where the summation is over all possible unique values of [stk|k] in S (i.e., all possible unique configurations of the first k stack frames seen in group 100).

Scoring module 118 calculates a stack frame rarity score for a given call stack configuration including its first k stack frames as:

$$r(stk,k) = -\log(P([stk|k])) - Ent(k)$$

Scoring module 118 preferably calculates stack frame rarity scores for a given call stack configuration for multiple, and preferably all, possible values of k available in the associated snapshot. Thus, for example, where a snapshot of a call stack includes 10 stack frames, a stack frame rarity score is calculated for the call stack when it includes its first stack frame only, and a stack frame rarity score is calculated for the call stack when it includes its first two stack frames, and so on up to 10 stack frames. Scoring module 118 then preferably calculates an overall call stack rarity score of a given call stack configuration as:

$$R(stk) = \max_k r(stk,k)$$

where R(stk) is the maximal stack frame rarity score value of r(stk,k) seen after calculating it for multiple values of k.

Scoring module 118 may be additionally configured to calculate the value $\text{Argmax}_k$ r(stk, k), denoting the "best" k value (i.e., fewest stack frames) that results in the maximum rarity score. Thus, where different values of k result in the same maximum value, the lowest k of these is preferably used. Scoring module 118 may be additionally configured to calculate a representative stack prefix value using Stk and its best k value, which is simply the first best-k stack frames of Stk.

An anomaly detector 120 is configured to identify anomalous behavior among any of the computers in group 100, based at least in part on the call stack rarity score, optionally together with the best k value and/or representative stack prefix of any of its snapshots. In one embodiment, the computers in group 100 are ranked according to their call stack rarity scores for snapshots of the same type of event detected for the same software application 106, and optionally by their best k values, where call stacks which have relatively high call stack rarity scores, such as in the top 5%, and, optionally, relatively low best k values as well, such as in the lowest 5%, are deemed anomalous. In another embodiment, any of the snapshots of the computers in group 100 for a given type of event detected for the same software application 106 is deemed anomalous if its representative stack prefix was not previously found in the snapshots reported by the computers in group 100. In another embodiment, machine learning algorithms, such as algorithms for the classification of malware invocations or clustering of malware invocations, may be applied to the call stack rarity scores, best k values, and/or representative stack prefix of the snapshots in snapshot repository 116, optionally in addition to other known metrics recorded for the computers in group 100, to determine that a call stack configuration of a given snapshot 108 is anomalous or otherwise identify anomalous behavior among the computers in group 100.

Anomaly detector 120 preferably sends a notification to the monitoring agent 104 of any of the computers in group 100 that exhibits anomalous behavior as described above, and/or to a user or administrator of the computer. Monitoring agent 104 is preferably configured to perform one or more predefined computer-security-related remediation actions in response to receiving such a notification. The remediation actions may, for example, include terminating the execution of software application 106, and/or providing a computer-security-related notification reporting the anomalous behavior, such as to a user or administrator of the computer. Any of the above notifications may include the name of software application 106, the call stack rarity score, best k value, and representative stack prefix of the associated call stack, or any combination thereof.

Any of the elements shown in FIG. 1 are preferably implemented in computer hardware in computer hardware and/or in computer software embodied in a non-transitory, computer-readable medium in accordance with conventional techniques.

Figure 2A:
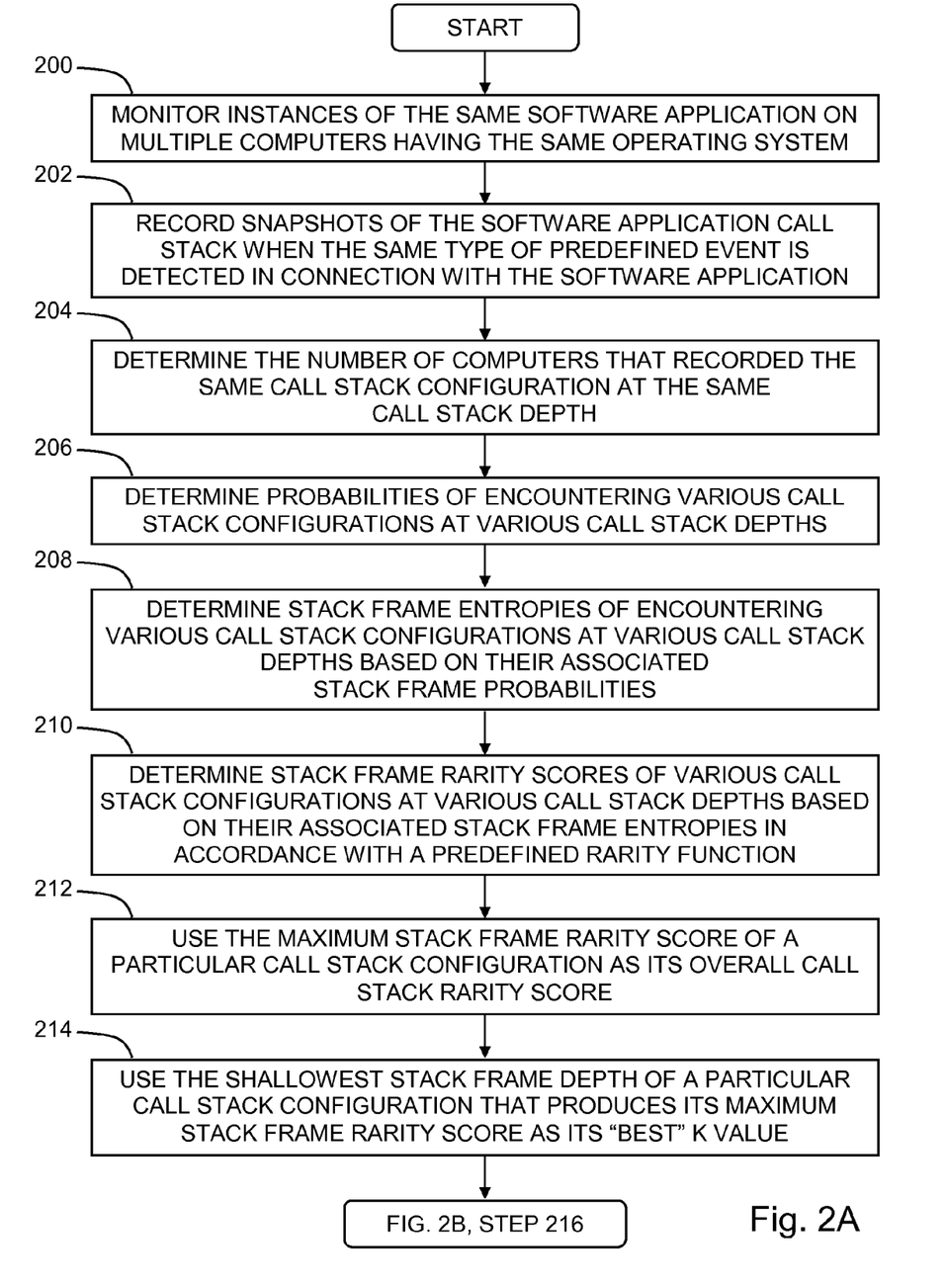
FIGS. 2A and 2B, taken together, is a simplified flowchart illustration of an exemplary method of operation of the system of FIG. 1, operative in accordance with an embodiment of the invention.
Figure 2B:
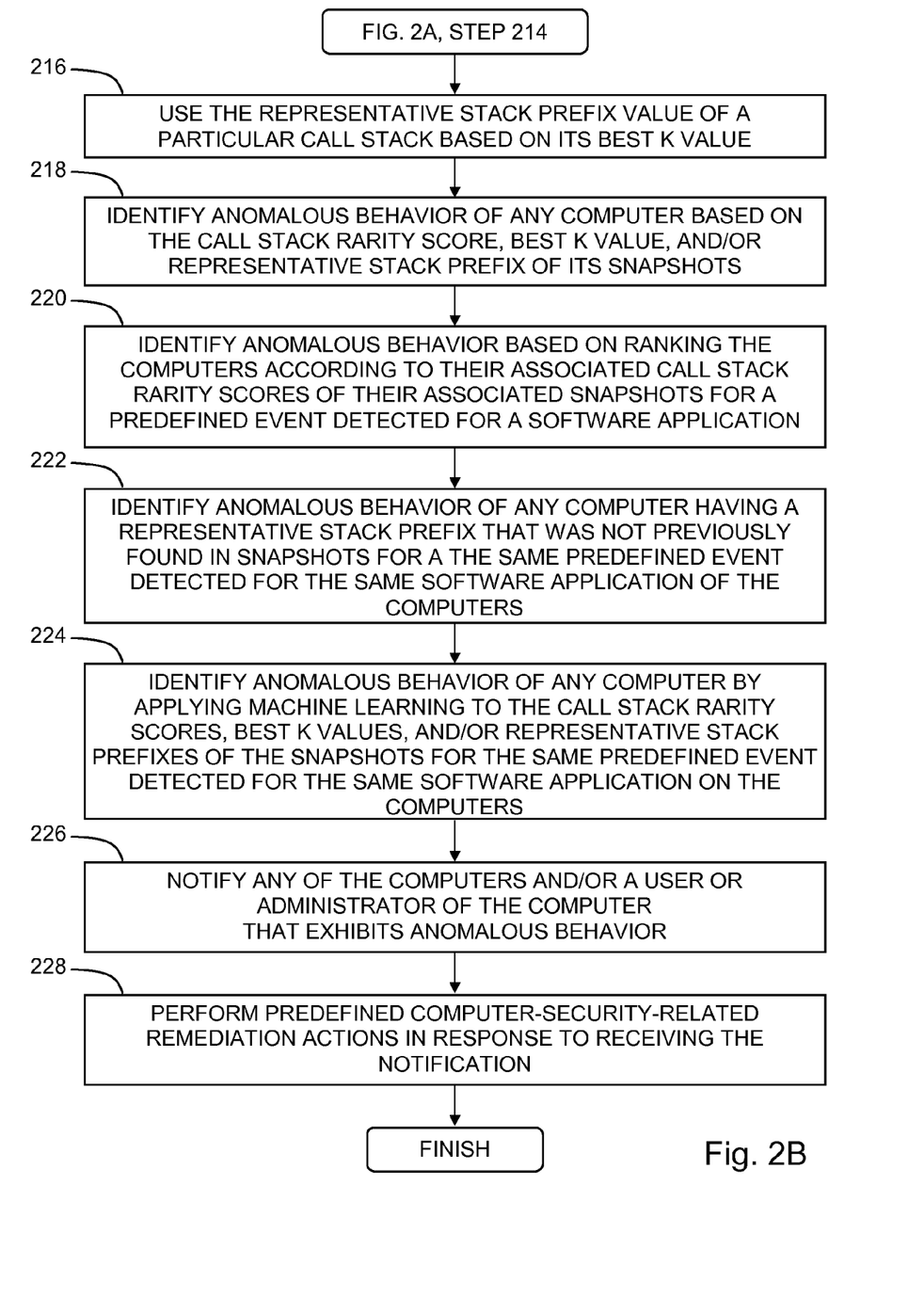

Reference is now made to FIGS. 2A and 2B which, taken together, is a simplified flowchart illustration of an exemplary method of operation of the system of FIG. 1, operative in accordance with an embodiment of the invention. In the method of FIGS. 2A and 2B, instances of the same software application are monitored on multiple computers having the same operating system (step 200). Snapshots of the software application call stack are recorded when the same type of predefined event is detected in connection with the software application (step 202), such as a create process event. For multiple call stack configurations, and for multiple stack frame depths of the call stack configurations, the number of computers that recorded the same call stack configuration at the same call stack depth (i.e., first k frames) is determined (step 204). Probabilities of encountering particular call stack configurations at various call stack depths are determined (step 206). Stack frame entropies at various call stack depths are determined based on their associated stack frame probabilities (step 208). Stack frame rarity scores of particular call stack configurations at various call stack depths are determined based on their associated stack frame entropies in accordance with a predefined rarity function (step 210). The maximum stack frame rarity score is used as the overall call stack rarity score (step 212). The shallowest stack frame depth (i.e., fewest stack frames) of a particular call stack that produces its maximum stack frame rarity score denotes its "best" k value (step 214). A representative stack prefix value of a particular call stack is calculated based on its best k value (step 216).

Anomalous behavior among any of the computers is identified based at least in part on the call stack rarity score, optionally together with the best k value and/or representative stack prefix of any of the snapshots (step 218). In one embodiment, the computers are ranked according to their call stack rarity scores for snapshots of the same type of event detected for the same software application, and optionally by their best k values, where call stacks which have relatively high rarity scores, such as in the top 5%, and, optionally, relatively low best k values as well, such as in the lowest 5%, are deemed anomalous (step 220). In another embodiment, any of the snapshots of the computers for a given type of event detected for the same software application is deemed anomalous if its representative stack prefix was not previously found in the snapshots reported by the computers (step 222). In another embodiment, machine learning algorithms, such as algorithms for the classification of malware invocations or clustering of malware invocations, may be applied to the call stack rarity scores, best k values, and/or representative stack prefix of the snapshots, optionally in addition to other known metrics recorded for the computers, to determine that a call stack configuration of a given snapshot is anomalous or otherwise identify anomalous behavior among the computers (step 224). A notification is sent to any of the computers that exhibits anomalous behavior and/or to a user or administrator of the computer (step 226). One or more predefined computer-security-related remediation actions are performed in response to receiving the notification (step 228), such as terminating the execution of the software application, and/or providing a computer-security-related notification reporting the anomalous behavior, such as to a user or administrator of the computer. Any of the above notifications may include the name of software application 106, the call stack rarity score, best k value, and representative stack prefix of the associated call stack, or any combination thereof.

Figure 3:
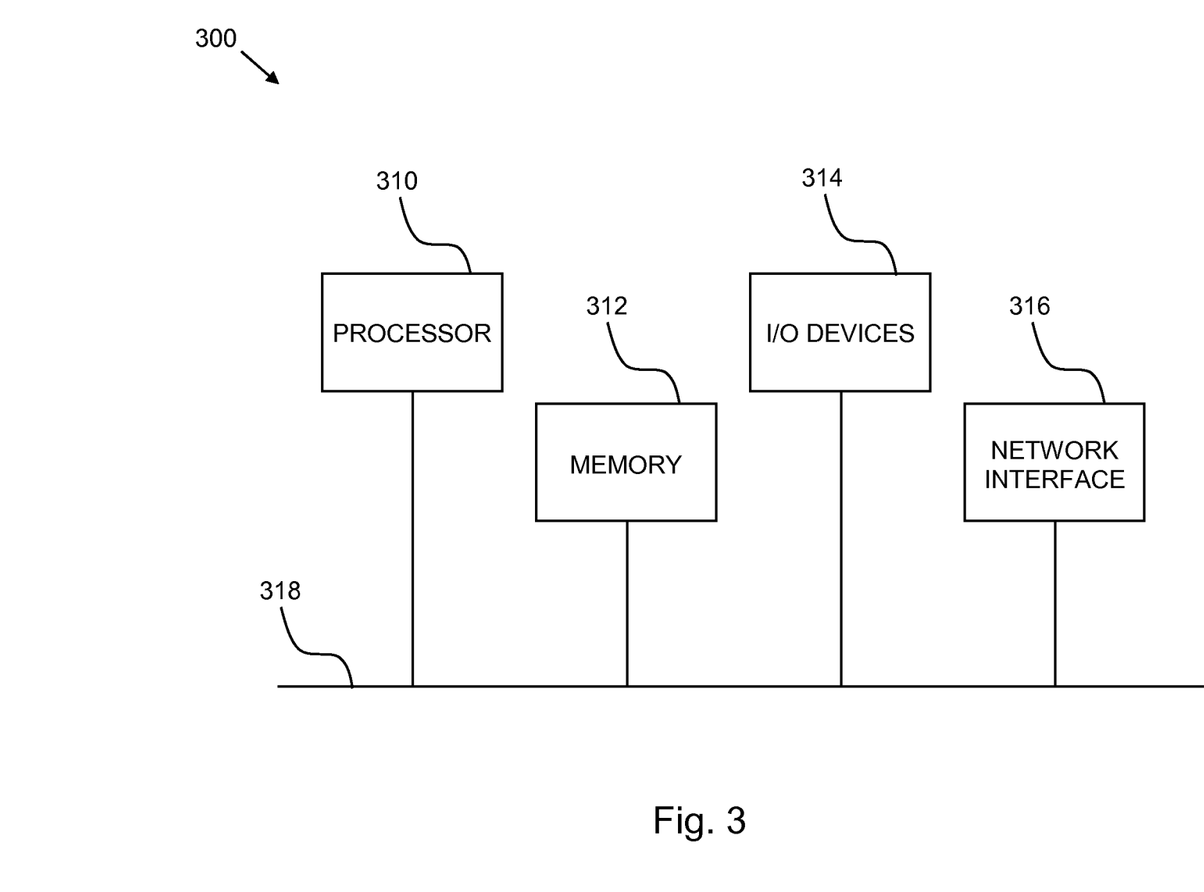
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1, 2A, and 2B) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer anomaly detection and software execution management system comprising:
   a monitoring agent configured to monitor, on each of a plurality of computers running the same operating system, the execution of a software application on each of the computers, wherein the software application is executed in at least one instance on each of the computers;
   a scoring module configured to
      determine stack frame probabilities of encountering various configurations of multiple call stacks at various call stack depths,
         wherein the call stacks are associated with the instances of the software application on the computers, and
         wherein multiple snapshots of the call stacks are recorded on the computers responsive to detecting a predefined event in connection with the software application,
      determine stack frame entropies of various configurations of the call stacks at various call stack depths based on their associated stack frame probabilities,
      determine stack frame rarity scores of various configurations of the call stacks at various call stack depths based on their associated stack frame entropies in accordance with a predefined rarity function, and
      determine a call stack rarity score of any given configuration of the call stacks as the maximum stack frame rarity score of the given configuration; and
   an anomaly detector configured to detect an anomaly associated with any given one of the computers wherein any of the snapshots recorded on the given computer is of a call stack whose call stack rarity score meets a predefined anomaly condition,
   wherein the monitoring agent is configured to terminate any of the execution instances of the software application on any of the computers with which the anomaly is associated.

2. The system of claim 1 wherein the monitoring agent is configured to
   record the snapshots on the computers.

3. The system of claim 1 wherein the anomaly detector is configured to rank the computers according to their associated call stack rarity scores of their associated snapshots for the predefined event detected for the software application.

4. The system of claim 1 wherein the predefined anomaly condition is that a representative stack prefix based on the fewest stack frames associated with the call stack rarity score was not previously found in the snapshots.

5. The system of claim 1 wherein the anomaly detector is configured to apply a machine learning algorithm to the call stack rarity scores to determine that any call stack configuration of any of the snapshots is anomalous.

6. The system of claim 1 wherein the anomaly detector is configured to apply a machine learning algorithm to representative stack prefixes based on the fewest stack frames associated with any of the call stack rarity scores to determine that any call stack configuration of any of the snapshots is anomalous.

7. A computer program product for computer anomaly detection and software execution management, the computer program product comprising:
- a non-transitory, computer-readable storage medium; and
- computer-readable program code embodied in the storage medium, wherein the computer-readable program code is configured to
  - monitor, on each of a plurality of computers running the same operating system, the execution of a software application on each of the computers, wherein the software application is executed in at least one instance on each of the computers,
  - determine stack frame probabilities of encountering various configurations of multiple call stacks at various call stack depths,
    - wherein the call stacks are associated with the instances of the software application on the computers, and
    - wherein multiple snapshots of the call stacks are recorded on the computers responsive to detecting a predefined event in connection with the software application,
  - determine stack frame entropies of various configurations of the call stacks at various call stack depths based on their associated stack frame probabilities,
  - determine stack frame rarity scores of various configurations of the call stacks at various call stack depths based on their associated stack frame entropies in accordance with a predefined rarity function,
  - determine a call stack rarity score of any given configuration of the call stacks as the maximum stack frame rarity score of the given configuration,
  - detect an anomaly associated with any given one of the computers wherein any of the snapshots recorded on the given computer is of a call stack whose call stack rarity score meets a predefined anomaly condition, and
  - terminate any of the execution instances of the software application on any of the computers with which the anomaly is associated.

8. The computer program product of claim 7 wherein the computer-readable program code is configured to record the snapshots on the computers.

9. The computer program product of claim 7 wherein the computer-readable program code is configured to rank the computers according to their associated call stack rarity scores of their associated snapshots for the predefined event detected for the software application.

10. The computer program product of claim 7 wherein the predefined anomaly condition is that a representative stack prefix based on the fewest stack frames associated with the call stack rarity score was not previously found in the snapshots.

11. The computer program product of claim 7 wherein the computer-readable program code is configured to apply a machine learning algorithm to the call stack rarity scores to determine that any call stack configuration of any of the snapshots is anomalous.

12. The computer program product of claim 7 wherein the computer-readable program code is configured to apply a machine learning algorithm to representative stack prefixes based on the fewest stack frames associated with any of the call stack rarity scores to determine that any call stack configuration of any of the snapshots is anomalous.

* * * * *